(12) United States Patent
Braganza et al.

(10) Patent No.: US 12,135,686 B2
(45) Date of Patent: Nov. 5, 2024

(54) CHANGE BLOCK TRACKING IN CLOUD ORCHESTRATION SYSTEMS

(71) Applicant: Kasten, Inc., Columbus, OH (US)

(72) Inventors: Carl Braganza, Sunnyvale, CA (US); Julio Lopez, Mountain View, CA (US)

(73) Assignee: KASTEN, INC., Columbus, OH (US)

( * ) Notice: Subject to any disclaimer, the term of this patent is extended or adjusted under 35 U.S.C. 154(b) by 227 days.

(21) Appl. No.: 17/513,580

(22) Filed: Oct. 28, 2021

(65) Prior Publication Data

US 2023/0134314 A1 May 4, 2023

(51) Int. Cl.
*G06F 16/11* (2019.01)
*G06F 3/06* (2006.01)

(52) U.S. Cl.
CPC .......... *G06F 16/128* (2019.01); *G06F 3/0604* (2013.01); *G06F 3/064* (2013.01); *G06F 3/065* (2013.01); *G06F 3/0685* (2013.01)

(58) Field of Classification Search
CPC ...... G06F 16/128; G06F 3/0604; G06F 3/064; G06F 3/065; G06F 3/0685
USPC ....................................................... 707/609
See application file for complete search history.

(56) References Cited

U.S. PATENT DOCUMENTS

| | | | | |
|---|---|---|---|---|
| 8,200,638 B1 * | 6/2012 | Zheng | ................. | G06F 11/1469 707/681 |
| 10,146,630 B1 * | 12/2018 | Kumar | ................. | G06F 16/2237 |
| 10,409,687 B1 * | 9/2019 | Bono | ................. | G06F 11/1451 |
| 2003/0182322 A1 * | 9/2003 | Manley | ................. | G06F 16/184 |
| 2005/0193245 A1 * | 9/2005 | Hayden | ................. | G06F 11/2069 714/13 |
| 2018/0089033 A1 * | 3/2018 | Tamura | ................. | G06F 16/178 |

OTHER PUBLICATIONS

International Search Report and Written Opinion directed to related International Patent Application No. PCT/US2021/057031, issued Jul. 19, 2022; 11 pages.

* cited by examiner

*Primary Examiner* — Hosain T Alam
*Assistant Examiner* — Saba Ahmed
(74) *Attorney, Agent, or Firm* — Sterne, Kessler, Goldstein & Fox P.L.L.C.

(57) ABSTRACT

Disclosed herein are system, method, and computer program products for storing a snapshot of block-level changes in a data volume using a file system-level backup tool. An embodiment operates by receiving the block level changes in the snapshot from the data volume stored in an application in a cluster. The embodiment creates a root directory for the snapshot. The root directory may have one or more subdirectories. The embodiment maps one or more block changes in the data volume onto the one or more subdirectories and creates a manifest for identifying the snapshot in the file system-level backup tool. The manifest may be associated with the root directory. The embodiment then instructs the file system-level backup tool to store the snapshot by storing the root directory in content-addressable object storage based on the one or more subdirectories and storing the manifest in a manifest storage.

17 Claims, 6 Drawing Sheets

CHANGE BLOCK TRACKING IN CLOUD ORCHESTRATION SYSTEMS

BACKGROUND

With the advent of cloud-native applications, various cloud orchestration systems have been designed for automating computer application management, backup, and migration. To process backup and migration, some cloud orchestration systems capture snapshots at a file system level in data volumes, providing a backup of changes at a directory level. This can be problematic because many changes to a data volume are small, perhaps to only one file. However, backing up at the file system level requires backing up the entire directory containing the file. Because the entire directory containing the change is captured in the snapshot, the snapshot is often much larger than necessary to reflect the actual change. Accordingly, additional resources are necessary to process and store the snapshot in a backup repository within a cloud orchestration system.

Many data volumes or systems containing data volumes for applications managed by a cloud orchestration system have the capability to track changes at a block-level, including providing application programming interfaces (APIs) that extract block-level change information. Tracking at a block level allows the backup system to track changes at the sub-file level, and thus more efficiently reflect changes in the data volume. Additionally, processing and storing the resulting snapshots require fewer resources. However, file system-level backup systems integrated with cloud orchestration systems are not configured to process block-level changes. As a result, these backup systems are unable to make use of the APIs that extract block-level change information and the more compact block-level changes themselves.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
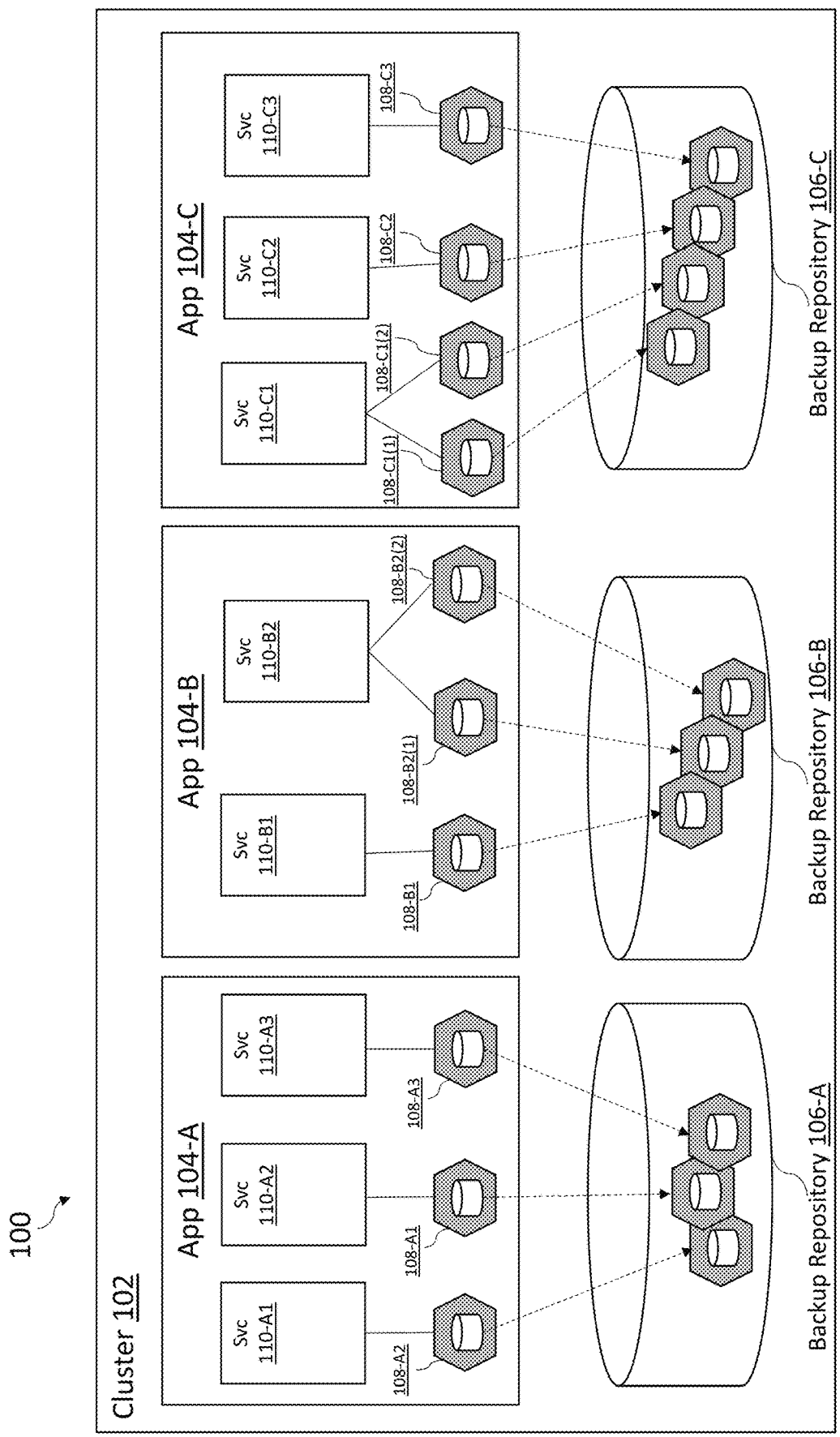
FIG. 1 is a block diagram illustrating a cloud orchestration system, according to some embodiments.

Provided herein are system, apparatus, device, method and computer program product embodiments, and/or combinations and sub-combinations thereof, for storing block-level changes in a backup system configured to store file system-level changes. With the increasing adoption of cloud-native architectures and platforms, a significant portion of applications and data have moved to cloud orchestration systems. Cloud orchestration systems can group containerized applications in a cluster to provide more flexibility in which repository an application may be backed up.

One approach for backing up data, such as, but not limited to, in cloud orchestration systems, is to capture snapshots of the data and store those snapshots in the cloud orchestration system. For example, Kubernetes® is a cloud environment that provides backup systems that stores snapshots of data volumes for an application in a cluster as backup. A snapshot can be captured from a data volume for the application and then later be used to restore the data in the snapshot to the same or another data volume. Some backup systems also capture a series of snapshots over time as changes are made to the data, allowing for backup to specific points in time.

In some cloud orchestration systems, the snapshots reflect changes to the data volume at a file system level. A file system-level snapshot stores changes to the data volume as a series of file directories that reflect the file system structure of the data volume. Changes to the contents of the directory are captured as part of the entire directory. For example, if a folder contains several documents, and one of those documents is changed, the entire folder is backed up as a single snapshot, rather than creating a snapshot of the individual document.

A cloud orchestration system may be integrated with file system-level backup tools to facilitate backups and migration. A file system-level backup tool or system integrated with cloud orchestration systems, such as, but not limited to, Kopia, is configured to backup from and restore to the data volume in the cluster of the cloud orchestration system using snapshots of the file system in the data volume. Backing up data volumes at the file system level using such tools can increase the size of the snapshots and consume additional resources compared to the level of changes that are being captured. For example, in a folder with many files, a small change to one file still captures the entire folder and all its files to the snapshot, rather than only backing up the single file.

Additionally, file system-level backup tools often require additional steps and structure to check for changes. For example, some file system-level backup tools identify changes to the data volume by accessing the operating system (OS) of the data volume, mounting its disk to the OS, and accessing the file system through the mounted disk.

Alternatively, changes to data volumes can be tracked at a block-level, rather than at the file system level. Block-level changes are changes to parts of the file rather than the whole file itself. Some data volumes or systems containing data volumes include APIs that extract block-level change information and exporting such changes, which avoids the need of accessing the OS, mounting the disk, and accessing the file system through the mounted disk. Instead, the APIs can extract the block-level changes directly. Creating snapshots with block-level change can be advantageous because the size of the snapshots is often smaller and fewer resources are consumed compared to creating file system-level snapshots. For example, the same folder with many files and a small change to one file may only require one or two block changes to represent the changes to the file. Rather than backing up a snapshot of all the files in the directory, a block-level snapshot only contains the changed blocks of the one file.

However, some file system-level backup tools are unable to interpret block-level changes. In some cases, this is because the block-level changes are not understandable to the file system-level backup tool. As a result, the backup tool is unable to take advantage of the block-level change information. Moreover, file system-level backup tools that do not use block-level changes are unable to access or use the APIs in the data volumes.

What is needed to solve these technological problems is a transformation of the block-level changes into a format that a file system-level backup tool integrated with a cloud orchestration system can interpret as file system-level changes. Moreover, what is needed is the capability to transform the file system-level snapshot back into block-level changes for restoring the changes to a data volume for applications in a cluster within a cloud orchestration system.

FIG. 1 is a block diagram illustrating a cloud orchestration system, according to some embodiments. System 100 is an example embodiment of a cloud orchestration system. The system 100 may contain one or more applications 104 (104-A, 104-B, 104-C, . . . , 104-X, . . . ). The applications 104 may be cluster managed by a cloud orchestrator or a cloud orchestration system 100, such as, but not limited to, Kubernetes, Amazon Elastic Container Service, AWS Fargate, Azure Container Instances, Google Cloud Run, Red Hat Openshift Container Platform, Rancher, Docker Swarm, Apache Mesos, Nomad, Google Kubernetes Engine, Azure Kubernetes Service, and/or any cloud orchestrator known to a person of ordinary skill in the art. The cluster 102 may simultaneously host and run multiple applications 104. The set of applications 104 in a cluster 102 can be dynamic, in which the composition of each application 104 may change over time (e.g., due to upgrades) and the set of applications 104 themselves may also change over time.

Each application 104 may be a distributed application comprising microservices 110 (110-A1, 110-A2, 110-A3, . . . , 110-X1 . . . ). Each microservice 110 may have persistent cloud provider volumes 108 (108-A1, 108-A2, 108-A3, . . . , 108-X1(1), 108X1(2), . . . ). Cloud provider volume 108 may be a data volume for storing data for a cloud provider or service, such as, but not limited to, Amazon Web Service (AWS) or Google Cloud. In some embodiments, cloud provider volume 108 is part of a stand-alone data storage system, such as, but not limited to, data storage server. Cloud provider volume 108 can communicate in a language or store data in a format specific to the cloud provider or service. Cloud provider volume 108 can be part of a computer system, such as, but not limited to, computer system 600. For example, the computer system can be a personal computer or other computer with a data volume, such as, but not limited to, a hard drive, that stores data and is backed up by a cloud provider service.

In order to back up the underlying data in a cloud orchestrator, the system 100 can use a per-application backup repository 106 (106-A, 106-B, 106-C, . . . 106-X, . . . ). An entire application 104 can be used as the unit when backing up application data in a backup repository 106. The system 100 can store the data from all the application persistent cloud provider volumes 108 in a single backup repository 106, such as an object store bucket. Moreover, data in a backup repository 106 may all belong to the same application 104 and data from different applications 104 may be stored in separate repositories 106.

Figure 2:
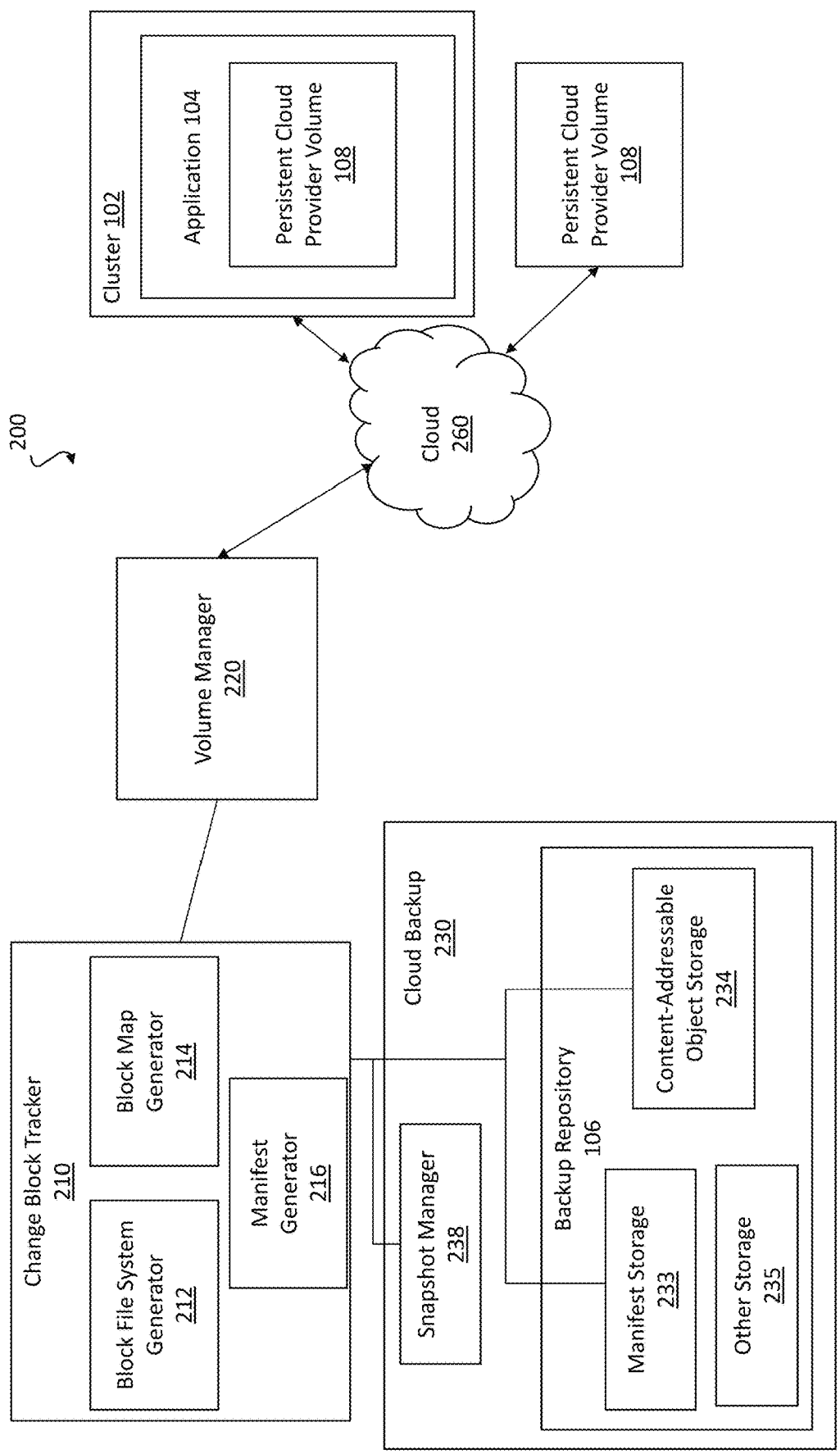
FIG. 2 is a block diagram of a cloud backup system, according to some embodiments.

FIG. 2 is a block diagram of a cloud backup system 200, according to some embodiments. In some embodiments, cloud backup system 200 includes a cloud backup 230, such as, but not limited to, a file system-level backup tool, a change block tracker 210, a volume manager 220, and a cloud provider volume 108 connected to volume manager 220 via a cloud 260. In some embodiments, cloud provider volume 108 is a standalone data volume. In some embodiments, cloud provider volume 108 is part of an application 104 in cluster 102.

In some embodiments, volume manager 220 provides an interface between change block tracker 210 and the cloud provider volume 108, including, but not limited to, providing format or system translation of data originating in cloud provider volume 108 for change block tracker 210. Change block tracker 210 can receive block-level changes from volume manager 220 and convert them into a snapshot that can be ready by cloud backup 230, which then stores the backup.

In some embodiments, cloud backup 230 provides snapshots in a file system-level format that represent block-level changes to change block tracker 210, which converts the file system-level snapshots to block-level changes. Volume manager 220 can translate the block-level changes to the format of cloud provider volume 108 and send or restore the block-level changes to the cloud provider volume 108 via cloud 260.

Volume manager 220, change block tracker 210, and cloud backup 230 may be controlled or operated by the same entity or different entities, and may be hosted on the same computer system or distributed across different computer systems in a network.

In some embodiments, cloud provider volume 108, or cluster 102 that contains or hosts cloud provider volume 108, can track changes at a block-level. Cloud provider volume 108 may have APIs configured to track the changes and prepare a set of block-level changes for a backup system.

Cloud provider volume 108 and cluster 102 can connect to a cloud provider and cloud provider services via cloud 260. Cloud 260 can be a cloud system or network which provides access to distributed computers or networks and cloud-based services.

Volume manager 220 may provide translation or conversion services between different formats of data or operating systems in change block tracker 210 and cloud provider volume 108. Volume manager 220 can be configured to communicate with cloud provider volume 108 based on the communication or data storage protocols of the specific cloud provider for cloud provider volume 108.

Volume manager 220 can translate data and communications, such as, but not limited to, block-level changes, between formats or operating systems of change block tracker 210 and cloud provider volume 108. The format translation can allow change block tracker 210 to operate using a data format of cloud backup 230 while providing conversion of block-level changes to a file system-level change snapshot or conversion of file system-level change snapshots to block-level changes for persistent cloud provider volumes 108 that are associated with different cloud providers.

Figure 6:
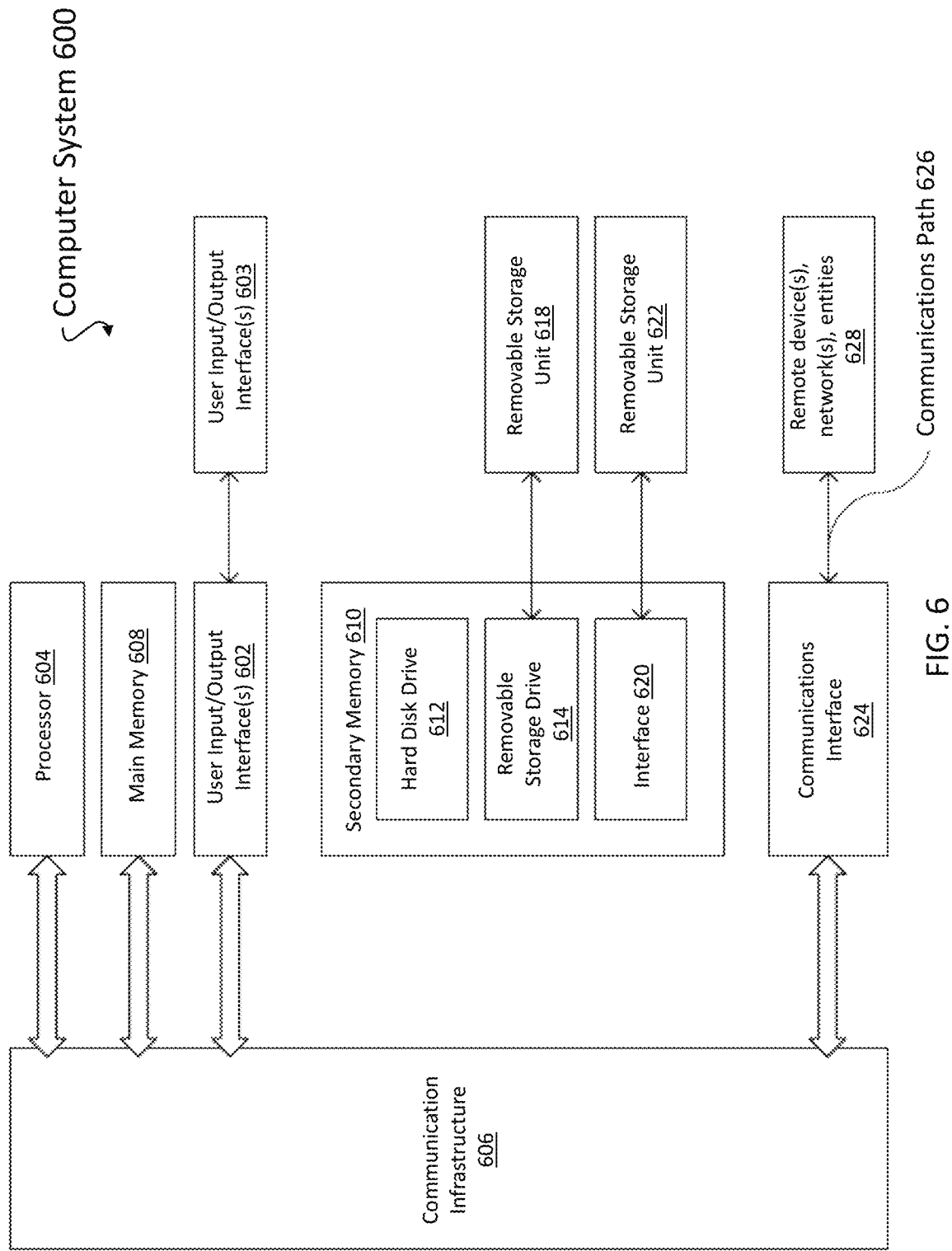
FIG. 6 is an example computer system useful for implementing various embodiments.

Volume manager 220 can be part of an independent system, such as, but not limited to, computer system 600 in FIG. 6. In Volume manager 220 can be a component or subsystem of change block tracker 210. Volume manager 220 may be controlled by change block tracker 210 and act as an adapter or translation software for change block tracker 210.

Change block tracker 210 can convert block-level changes from cloud provider volume 108 to a file system-level change format. This file system-level format can be stored by cloud backup 230 that stores a file system-level snapshots. Change block tracker 210 may use volume manager 220 to translate or convert block-level changes to a data format that change block tracker 210 can read. For example, if the block-level changes are from cloud provider volume 108 that operates under AWS as its cloud provider, change block tracker 210 uses volume manager 220 to translate or convert the block-level changes from an AWS format to block-level changes in a format used by change block tracker 210. Change block tracker 210 may be configured to communicate with a specific cloud backup 230, such as, but not limited to, Kopia or Restic. Change block tracker 210 can access APIs on cloud provider volume 108 to extract the block-level changes.

Change block tracker 210 can have a block file system generator 212, which generates a file system or file directory based on the block-level changes, manifest generator 216, which generates a manifest, and block map generator 214, which converts a snapshot formatted by change block tracker 210 back into block-level changes. Change block tracker 210 can operate on or be part of a computer or network system, such as, but not limited to, computer system 600 shown in FIG. 6.

Block file system generator 211 can create a file system or directory for storing the block-level changes. The file system or directory can be a root-level directory with subdirectories. The subdirectories may store individual block-level changes. The subdirectories storing individual block-level changes may be labeled or named based on the block in cloud provider volume 108 from which the individual block-level change were captured. The file directory can allow the block-level changes to be presented to cloud backup 230, such as, but not limited to, a file system-level backup tool, in a format or structure which cloud backup 230 is able to interpret as file system-level changes, despite the changes originating as block-level changes in cloud provider volume 108.

In some embodiments, the subdirectories include a subdirectory for a link to an earlier-captured snapshot from the same cloud provider volume 108. Snapshots can allow persistent cloud provider volumes 108 to be restored back to a certain point in time. Changes to cloud provider volume 108 in different snapshots may each be accounted for. For example, if changes are made to a file at different times, different block-level changes result, and these different block-level changes are captured at the different times in different snapshots. To restore the file, each of these changes is accounted for by restoring each of the snapshots. The link allows for a chain or nested-tree structure to link the snapshots together. An embodiment of such a structure is described further in FIG. 4 below.

In some embodiments, the subdirectories include a subdirectory for storing a manifest containing metadata describing the snapshot. The metadata can include, but is not limited to, one or more of a description of the snapshot, a size of the snapshot, a time stamp for the snapshot, a number of blocks that were changed, an associated cloud provider volume 108, and a metadata key that identifies the snapshot. For example, the metadata key identifies the snapshot by one or more of the volume name from which the snapshot was stored, the snapshot name, the snapshot number, or the date and time on which the snapshot was captured.

The manifest can be stored in a JavaScript Object Notation (JSON) document. Manifest generator 216 can generate the manifest based on the block-level changes and cloud provider volume 108.

Change block tracker 210 can store snapshots in cloud backup 230 by presenting them to snapshot manager 238 as a file system-level snapshot. The file system-level snapshot can be the file directory, which is treated as content addressable object data, along with a manifest.

Change block tracker 210 can restore data by requesting snapshots from cloud backup 230. Change block tracker 210 may access or recall the snapshots via block map generator 214.

Block map generator 214 can convert snapshots with block-level changes, such as, but not limited to, those created by block file system generator 212, into block-level changes in a block map of cloud provider volume 108. Block map generator 214 generates a block map of cloud provider volume to which the snapshots are to be restored. The block map may be based on the metadata or information about how cloud provider volume 108 is configured, such as, but not limited to, a block structure of the data volume. Block map generator 214 can map the block-level changes from the file directories in the snapshot. Each directory may contain an individual block change and block map generator 214 can map that change to the corresponding block in the block map. The corresponding block in the block map for the individual block change may be identified based on the metadata or the name of the subdirectory in which the individual block change is stored in the snapshot.

In some embodiments, block map generator 214 accesses snapshots from cloud backup 230 to convert the snapshots into the block-level changes in the block map. Block map generator 214 may identify a snapshot based on a metadata key that corresponds to the manifest for the snapshot or information contained in the file directory for the snapshot, such as, but not limited to, a the name of the root directory. Block map generator 214 can identify a link in the manifest or a subdirectory of the snapshot that links to an earlier-captured snapshot. Block map generator 214 can recall or access snapshots based on the metadata key and the links until a designated snapshot or a snapshot with no link is recalled or accessed. These snapshots can form a set of snapshots to be restored. Block map generator 214 can generate the block map and block-level changes based on the set of snapshots. Where the set of snapshots contain more than one block change for the same block in the block map, block map generator 214 can use the block change from the snapshot with the most recent time stamp. Block map generator 214 can write block changes into the block map starting with the snapshot in the set of snapshots with the oldest time stamp and overwrites block changes in the block map with block change that are from snapshots with a more recent or later time stamp.

Cloud backup 230 can be a file system-level backup tool that can store snapshots of file system changes. For example, cloud backup 230 is Kopia, Restic, or other similar cloud backup systems known to those skilled in the art.

Snapshot manager 238 can control receipt of and access to the snapshots. When a snapshot is received, snapshot manager may store the file system-level changes and a related manifest in backup repository 106. The manifest stored in manifest storage 233 and the file system-level changes may be stored in content-addressable object storage 234. Other information or data that is part of the backup process may be stored in other storage 235.

Snapshot manager 238 can allow access to the snapshots by granting requests to backup repository 106, such as, but not limited to, to change block tracker 210. Snapshot manager 238 can allow systems to access the snapshots and recall them from content-addressable object storage 234. Snapshot manager 238 can allow systems to access a manifest for the snapshot stored in manifest storage 233. In Cloud backup 230 can restore file system-level changes directly to data volumes, such as, but not limited to, cloud provider volume 108, but only as file system-level changes.

Those skilled in the art will appreciate that, in some embodiments, when cloud backup 230 is a file system-level backup tool, cloud backup 230 only receives, stores, and restores file system-level changes. However, cloud backup 230 does not consider the content or its origin, it only process data that is formatted as file system-level backup changes. Thus, change block tracker 210 can allow cloud backup 230 to store block-level changes in a file system-level change system by formatting the block-level changes in a way that makes them indistinguishable to actual file system-level changes, as far as cloud backup 230 is concerned. In some embodiments, because cloud backup 230 lacks capability to restore the block-level changes from the file system-level change format to a data volume, cloud backup 230 can only provides the snapshots back to change block tracker 210 for restoration, rather than performing the restoration itself.

Figure 3:
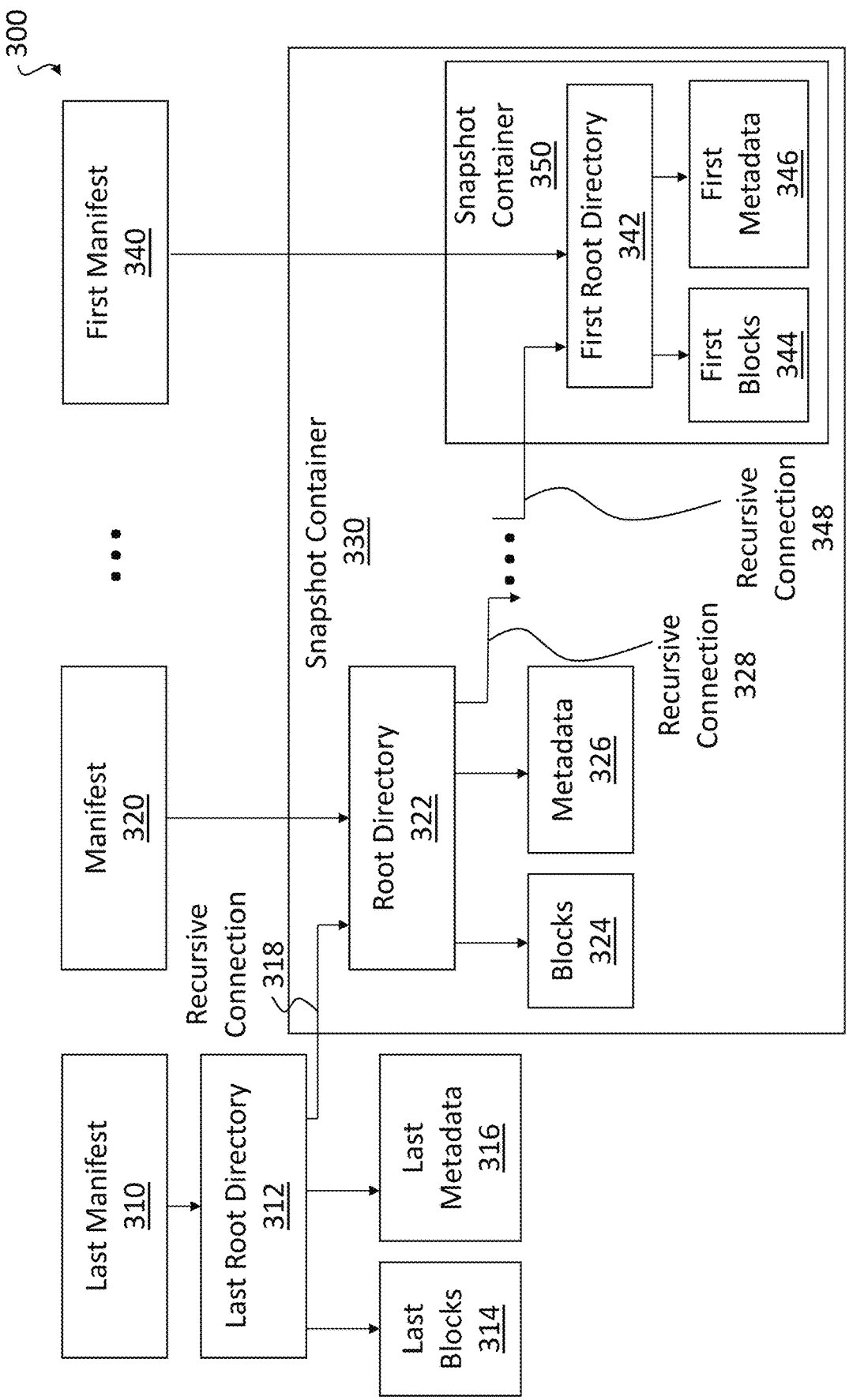
FIG. 3 is a block diagram of a nested storage structure for snapshots in a cloud backup system, according to some embodiments.

FIG. 3 is a block diagram of a nested storage structure 300 for snapshots in a cloud backup system, according to some embodiments. A set of snapshots linked together through links can represent changes to a data volume over time. Nested storage structure 300 is a nested tree or set of links that can describe how the set of snapshots are related and provide structure to the elements of the snapshots. Nested storage structure 300 may not represent how the set of snapshots is stored, but rather be a visual representation of how the snapshots relate and are restored by change block tracker 210 and block map generator 214. The set of snapshots may have a first snapshot that is the oldest and a last snapshot that is the newest. The set of snapshots may also have a number of snapshots in between that are order chronologically by their time stamp according to nested storage structure 300.

The last snapshot can have a last manifest 310, a last root directory 312, last blocks 314, last metadata 316, and link that provides recursive connection 318 to a snapshot container 330 that contains the next snapshot in the set of snapshots and any other snapshots older than that snapshot.

In some embodiments, snapshot container 330 is not an actual part of the storage snapshots, but shows how the set of snapshots relate. This is because nested storage structure 300 relates to restoration of the snapshots rather than their storage. For example, every snapshot in the set of snapshots before the last snapshot can be treated as a single snapshot representing all changes in the set of snapshots that have been backed up before the last snapshot. Snapshot container 330 can be a representation of this concept and can be treated as a container for a single snapshot of the earlier changes.

Similarly, snapshot container 350 may contain only the first snapshot, which is not linked to any earlier snapshots. Each snapshot container can be treated as a complete set of changes up to the point in time of the most recent snapshot that corresponds to the particular snapshot container. Thus, the last snapshot may be treated as a single snapshot in a container containing the set of snapshots. By selecting the last snapshot, a user may identify the time stamp of the snapshot that they wish to restore. However, at the time of storage, this has no particular meaning. In short, nested storage structure is useful in understanding recall and restoration of a set of snapshots based on a particularly recalled snapshot as the requested point in time.

Intermediary snapshots between the first and the last snapshot can be represented by manifest 320, root directory 322, blocks 324, and metadata 326, and are connected by links that provide recursive connections 328 to other intermediary snapshots and recursive connection 348, which provides a link to the first snapshot. The first snapshot can have first manifest 340, first root directory 342, first blocks 344, and first metadata 346.

Each snapshot in the set of snapshots has a root directory, such as, but not limited to, last root directory 312, root directory 322, and first root directory 342. The root directory has subdirectories that contain the block changes, such as, but not limited to, last blocks 314, blocks 324, and first blocks 344. The root directory can be the file system or file directory created by block file system generator 212.

The subdirectories can contain metadata, such as, but not limited to, last metadata 316, metadata 326, and first metadata 346. The metadata can describe the snapshot. The metadata can include, but is not limited to, one or more of a description of the snapshot, a size of the snapshot, a time stamp for the snapshot, a number of blocks that were changed, an associated data volume, and a metadata key that identifies the snapshot. The metadata may be stored in a JavaScript Object Notation (JSON) document. The metadata can be the metadata from the manifest generated by manifest generator 216.

In some embodiments, the subdirectories contain a link, such as, but not limited to, recursive connections 318, 328, and 348, that links to or identifies an earlier-captured snapshot from the same cloud provider volume 108.

In some embodiments, the snapshots have manifests, such as, but not limited to, last manifest 310, manifest 320, and first manifest 340. The manifest can contain the metadata describing the snapshot. The metadata can include, but is not limited to, one or more of a description of the snapshot, a size of the snapshot, a time stamp for the snapshot, a number of blocks that were changed, an associated data volume, and a metadata key that identifies the snapshot. The manifest may be stored in a JavaScript Object Notation (JSON) document. The manifest may contain some or all of the same metadata as the corresponding last metadata 316, metadata 326, and first metadata 346 for the snapshot. The manifest can be generated by manifest generator 216.

In some embodiments, change block tracker 210 creates a new snapshot from a set of snapshots stored in cloud backup 230. Change block tracker 210 may collapse the set of snapshots into the new snapshot. Block map generator 214 can recall a set of snapshots based on a metadata key identifying a most recent snapshot and the recursive links. Block map generator 214 may generate a map of block changes based on the set of snapshots. Block file system generator 212 can generate a new file system or directory for the block-level changes in the set of snapshots based on the map. Manifest generator 216 can generate a new manifest. Change block tracker 210 can store the new snapshot in cloud backup 230. The new snapshot represents the cumulative set of changes of the set of snapshots. The new snapshot can also be a single snapshot representing the snapshot container containing all of the snapshots in the set of snapshots used to create the new snapshot.

Figure 4:
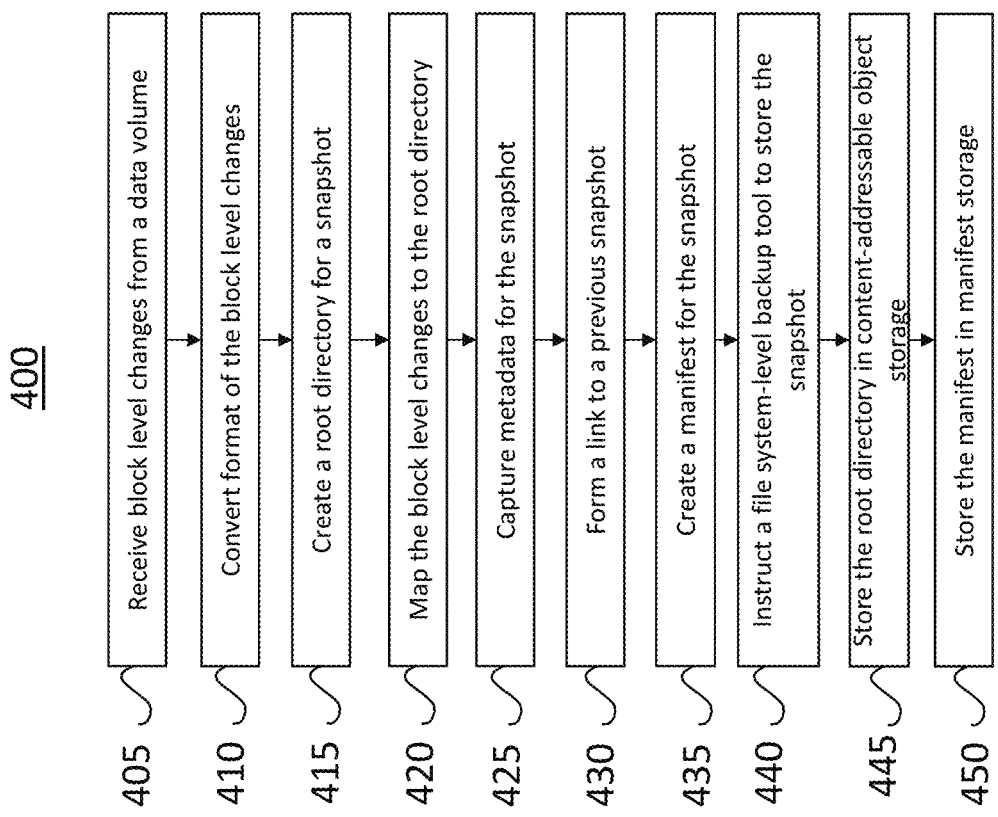
FIG. 4 is a flowchart illustrating a method for storing a snapshot, according to some embodiments.

FIG. 4 is a flowchart illustrating a method 400 for storing a snapshot, according to some embodiments. FIG. 4 is described with reference to FIGS. 2 and 3. Method 400 can be performed by processing logic that can comprise hardware (e.g., circuitry, dedicated logic, programmable logic, microcode, etc.), software (e.g., instructions executing on a processing device), or a combination thereof. For example, method 400 can be performed by one or more computers or computer processors, such as, but not limited to, computer system 600, implementing change block tracker 210 and volume manager 220 to store snapshots in cloud backup 230. It is to be appreciated that not all steps may be needed to perform the disclosure provided herein. Further, some of the steps may be performed simultaneously, or in a different order than shown in FIG. 4, as will be understood by a person of ordinary skill in the art.

In 405, volume manager 220 or change block tracker 210 receives block-level changes from a data volume, such as, but not limited to, cloud provider volume 108. Volume manager 220 or change block tracker 210 can request the block-level changes from the data volume using APIs for the data volume that can detect and output the block-level changes to the data volume. Volume manager 220 or change block tracker may receive the block-level changes by extracting them from the data volume. The block-level changes can be in a format specific to the data volume. Volume manager 220 may retrieve the block level changes in the snapshot from the cloud provider volume 108 stored in application 104 in cluster 102.

In 410, volume manager 220 converts the format of the block-level changes from the format specific to the data volume to a format specific to change block tracker 210 or cloud backup 230. For example, volume manager 220 converts the block-level changes from an AWS cloud service provider format to a Kopia cloud backup format.

In 415, block file system generator 212 creates a root directory for the snapshot. The root directory can contain subdirectories for storing information that is part of the snapshot. The root directory can be generated in a format that cloud backup 230 interprets as a snapshot of file system-level changes. The root directory may be last root directory 312, root directory 322, or first root directory 342. The root directory can be structured based on the block changes that are being stored in the snapshot.

In 420, block file system generator 212 maps the block-level changes to the root directory. The mapping can involve storing each of the block-level changes in a separate subdirectory. The subdirectories may be named in a way to identify the block in the data volume where the block-level change occurred or originated. A subdirectory may be assigned a label corresponding to the block change that is stored in the subdirectory.

In 425, change block tracker 210 captures metadata for the snapshot. The metadata can describe the root directory and a manifest describing the snapshot. Change block tracker 210 can map or store the metadata to a subdirectory of the root directory. The metadata may be last metadata 316, metadata 326, or first metadata 346. The metadata may contain a metadata key that identifies the snapshot.

In 430, block file system generator 212 forms a link to a previous snapshot. The link can be between the root directory for the snapshot to the root directory of a different snapshot captured prior to the snapshot. The different snapshot may have been captured sequentially in a set of snapshots before the snapshot. The link may be stored in a subdirectory of the root directory for storing a link. For example, if a first snapshot was captured and stored from a data volume using method 400 and later a second snapshot is captured from the same data volume, a link between the two.

In 435, manifest generator 216 creates or generates a manifest for the snapshot. The manifest may contain some or all of the metadata. The manifest may be last manifest 310, manifest 320, or first manifest 340. The manifest may identify the snapshot in the file system-level backup tool and the manifest is associated with the root directory.

In 440, change block tracker 210 instructs a file system-level backup tool to store the snapshot. The file system-level backup tool may be cloud backup 230. Change block tracker 210 can interface with snapshot manager 238 to store the snapshot. Snapshot manager 238 can handle the processing and storage of the snapshot in cloud backup 230.

In 445, cloud backup 230 stores the root directory in content addressable object storage 234. The root directory may be stored based on the one or more subdirectories. Cloud backup 230 can store the root directory in response to the instructions from change block tracker 210 in operation 440.

In 450, cloud backup 230 stores the manifest in manifest storage 233. Cloud backup 230 can store the manifest in response to the instructions from change block tracker 210 in operation 440.

Figure 5:
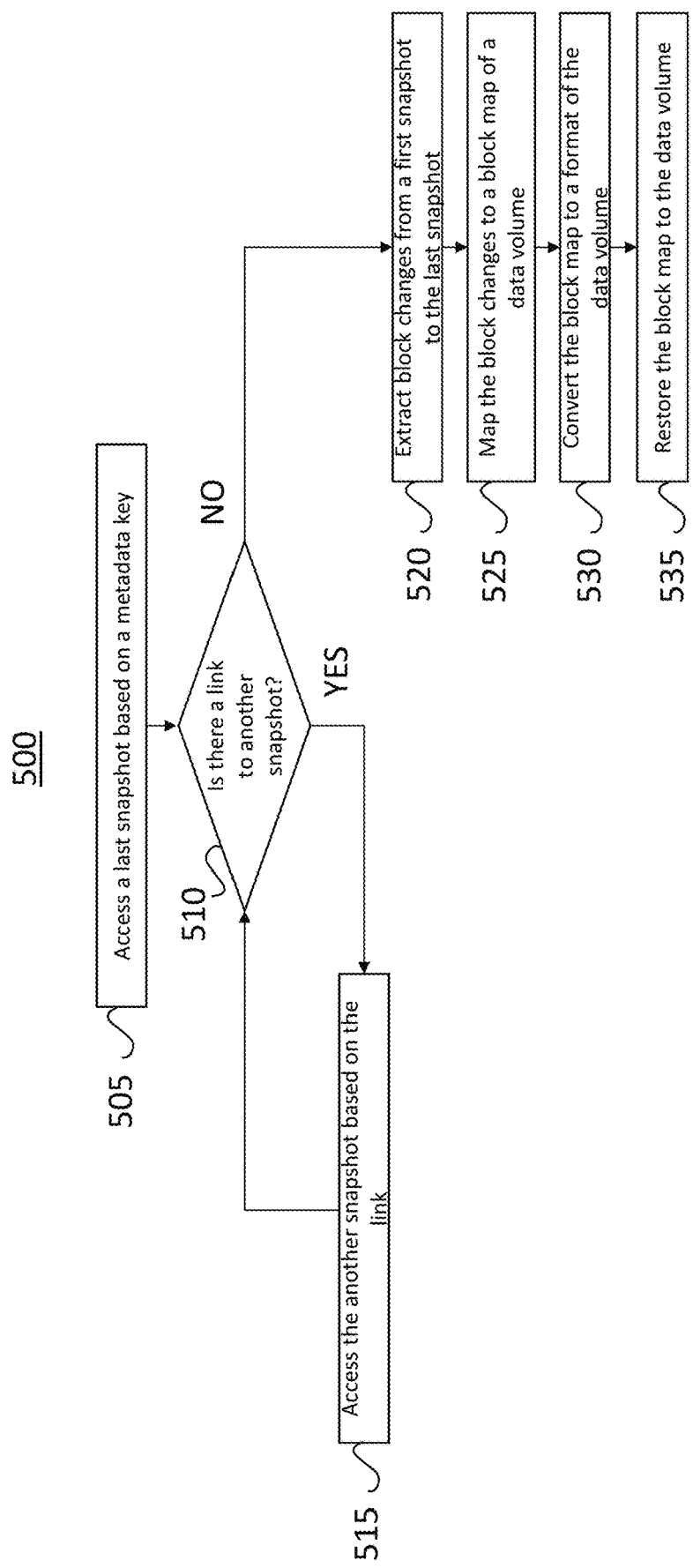
FIG. 5 is a flowchart illustrating a method for restoring a snapshot, according to some embodiments.

FIG. 5 is a flowchart illustrating a method 500 for restoring a snapshot, according to some embodiments. FIG. 5 is described with reference to FIGS. 2 and 3. Method 500 can be performed by processing logic that can comprise hardware (e.g., circuitry, dedicated logic, programmable logic, microcode, etc.), software (e.g., instructions executing on a processing device), or a combination thereof. For example, method 500 is performed by one or more computers or computer processors, such as, but not limited to, computer system 600, implementing change block tracker 210 and volume manager 220 to restore snapshots in cloud backup 230 to a data volume, such as, but not limited to, cloud provider volume 108. It is to be appreciated that not all steps may be needed to perform the disclosure provided herein. Further, some of the steps may be performed simultaneously, or in a different order than shown in FIG. 5, as will be understood by a person of ordinary skill in the art.

In 505, change block tracker 210 accesses a last snapshot based on a metadata key. Change block tracker 210 can receive or access the last snapshot from cloud backup 230. The last snapshot may be the most recently stored snapshot in a set of snapshots linked by links, such as, but not limited to, a set of snapshots described by nested storage structure 300 in FIG. 3.

In some embodiments, a user specifies the last snapshot and change block tracker 210 determines the metadata key for the snapshot. Cloud backup 230 may identify the last snapshot with metadata in a metadata subdirectory that contains the metadata key. The metadata key may include, but is not limited to, identifiers of the data volume from which the snapshot was stored and the last snapshot. Cloud backup 230 may identify a manifest corresponding to the snapshot based on the metadata key.

In 510, change block tracker 210 determines or identifies whether there is a link to another snapshot in the last snapshot. If there is, operation 510 proceeds to operation 515. If there is not, operation 510 proceeds to operation 520.

In 515, change block tracker 210 accesses the another snapshot based on the link. Change block tracker 210 can receive or access the another snapshot from cloud backup 230. The another snapshot may have been stored sequentially immediately before snapshot that was linked to it.

Operation 515 then returns to operation 510, which determines or identifies whether there is a link to a further snapshot from the another snapshot, then proceeds to operation 515 or operation 520, accordingly. As part of accessing or receiving the snapshot, cloud backup 230 may identify a manifest for the another snapshot based on the link Method 500 repeats the loop between operations 510 and 515 until the set of snapshots is accessed and one of the snapshots does not have a link to an earlier snapshot. In this way, method 500 accesses the set of snapshots in cloud backup 230.

Each of the snapshots in the set of snapshots may have a root directory and subdirectories. Each snapshot except the earliest captured snapshots may have a link in a link subdirectory to an earlier snapshot. The earliest captured snapshot may be the first snapshot. The snapshots may be snapshots created by method 400, as described above.

In 520, block map generator 214 extracts block changes from the first snapshot to the last snapshot. Block map generator 214 may begin with the first or earliest captured snapshot and extract the block changes from the snapshot from their respective subdirectories in the root directory for the snapshot. Block map generator 214 can then follows the link to the next snapshot and extracts the block changes from that snapshot, and so on until the last snapshot in the set of snapshots has its block changes extracted.

In 525, block map generator 214 maps the block changes to a block map of a data volume, such as, but not limited to, cloud provider volume 108. The block changes can be mapped to the block map based on the root directory and the subdirectories. The block changes may be mapped based on the label for the subdirectory.

Block map generator 214 can sequentially map the block changes for each snapshot to the block map based on their link, starting with the first snapshot and ending with the last snapshot. Block map generator 214 may overwrite a first block change mapped to the block map with a second block change in response to the first block change and the second block change having a same address or location in the block map and the first block change being from an earlier snapshot with an earlier time stamp than the time stamp of the second block change.

Block map generator 214 can map the block changes by starting with first root directory 342 and blocks 344 and proceeds through recursive connection 348 and so forth through recursive link 338 to root directory 322 and blocks 324 through recursive connection 318 to root directory 312 and blocks 324, as described in FIG. 3.

In 530, volume manager 220 converts the block map to a format of the data volume. Converting the format can include, but it's not limited to, converting the format of the block map from a format of cloud backup 230 or change block tracker 210 to a format of the data volume to which the set of snapshots is being restored.

In 535, change block tracker 210 restores the block map to the data volume. Change block tracker 210 can restore the block changes in the block map to the blocks in the data volume by overwriting or changing the blocks in the data volume based on the block changes.

FIG. 6 is an example computer system useful for implementing various embodiments.

Various embodiments can be implemented, for example, using one or more computer systems, such as, but not limited to, computer system 600 shown in FIG. 6. Computer system 600 can be used, for example, to implement method 400 of FIG. 4 or method 500 of FIG. 5. Computer system 600 can be any computer capable of performing the functions described herein.

Computer system 600 can be any well-known computer capable of performing the functions described herein.

Computer system 600 includes one or more processors (also called central processing units, or CPUs), such as, but not limited to, a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as, but not limited to, mathematically intensive data common to computer graphics applications, images, videos, etc.

Computer system 600 also includes user input/output device(s) 603, such as, but not limited to, monitors, keyboards, pointing devices, etc., that communicate with communication infrastructure 606 through user input/output interface(s) 602.

Computer system 600 also includes a main or primary memory 608, such as, but not limited to, random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as, but not limited to, that found in video game devices), a removable memory chip (such as, but not limited to, an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JSON, XML, YAML, Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as, but not limited to, computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for storing a snapshot of block-level changes in a data volume for an application that is stored by at least one physical storage device within a cluster and restoring the snapshot to the data volume using a file system-level backup tool that is able to interpret file system-level changes but is unable to interpret the block-level changes, the computer-implemented method comprising:

receiving the block-level changes from the data volume stored in the application in the cluster;

creating a file system for the snapshot, wherein the file system comprises a root directory having a plurality of subdirectories;

storing each of the block-level changes in the data volume in a corresponding one of the subdirectories, wherein storing each of the block-level changes in the data volume in a corresponding one of the subdirectories comprises assigning each of the respective subdirectories a respective label for a respective block-level change stored in the respective subdirectory, wherein the respective label corresponds to a respective location in the data volume where the respective block-level change originated;

creating a manifest for identifying the snapshot in the file system-level backup tool, wherein the manifest is associated with the root directory;

instructing the file system-level backup tool to store the snapshot by:
storing the file system in content-addressable object storage; and
storing the manifest in a manifest storage;

receiving the snapshot from the file system-level backup tool by receiving the file system therefrom;

mapping the block-level changes from the respective subdirectories of the file system into a block map of the data volume; and restoring the snapshot to the data volume based on the block map.

2. The computer-implemented method of claim 1, further comprising:
forming a link between the root directory and a different root directory corresponding to a different snapshot captured before the snapshot; and
storing the link in a link subdirectory of the root directory.

3. The computer-implemented method of claim 1, further comprising:
converting the block-level changes from a format of the data volume into a format for the file system-level backup tool.

4. The computer-implemented method of claim 1, further comprising:
converting the block map from a format of the file system-level backup tool into a format of the data volume.

5. The computer-implemented method of claim 1, wherein mapping the block-level changes from the respective subdirectories of the file system into the block map of the data volume comprises:
mapping the block changes from the respective subdirectories of the file system into the block map of the data volume based on the respective label for each subdirectory.

6. The computer-implemented method of claim 1, further comprising:
capturing metadata describing the root directory and the manifest; and
storing the metadata in a metadata subdirectory of the root directory.

7. A system for storing a snapshot of block-level changes in a data volume for an application that is stored by at least one physical storage device within a cluster and restoring the snapshot to the data volume using a file system-level backup tool that is able to interpret file system-level changes but is unable to interpret the block-level changes, comprising:
a processor; and
at least one processor coupled to a memory and configured to:
receive the block-level changes from the data volume stored in the application in the cluster;
create a file system for the snapshot, wherein the file system comprises a root directory having a plurality of subdirectories;
store each of the block-level changes in the data volume in a corresponding one of the subdirectories, wherein to store each of the block-level changes into a corresponding one of the subdirectories, the at least one processor is configured to assign each of the respective subdirectories a respective label for a respective block-level change stored in the respective subdirectory, wherein the respective label corresponds to a respective location in the data volume where the respective block-level change originated;
create a manifest for identifying the snapshot in the file system-level backup tool, wherein the manifest is associated with the root directory;
instruct the file system-level backup tool to store the snapshot by:
storing the file system in content-addressable object storage; and
storing the manifest in a manifest storage;
receive the snapshot from the file system-level backup tool by receiving the file system therefrom;

mapping the block-level changes from the respective subdirectories of the file system into a block map of the data volume; and
restoring the snapshot to the data volume based on the block map.

8. The system of claim 7, wherein the at least one processor is further configured to:
form a link between the root directory and a different root directory corresponding to a different snapshot captured before the snapshot; and
store the link in a link subdirectory of the root directory.

9. The system of claim 7, wherein the at least one processor is further configured to:
convert the block-level changes from a format of the data volume into a format for the file system-level backup tool.

10. The system of claim 7, wherein the at least one processor is further configured to:
convert the block map from a format of the file system-level backup tool into a format of the data volume.

11. The system of claim 7, wherein the at least one processor is configured to map the block changes from the respective subdirectories of the file system into the block map of the data volume by:
mapping the block-level changes from the respective subdirectories of the file system into the block map of the data volume based on the respective label for each subdirectory.

12. The system of claim 7, wherein the at least one processor is further configured to:
capture metadata describing the root directory and the manifest; and
store the metadata in a metadata subdirectory of the root directory.

13. A non-transitory computer readable storage medium having instructions stored thereon that, when executed by at least one computing device, cause the at least one computing device to perform operations for storing a snapshot of block-level changes in a data volume for an application that is stored by at least one physical storage device within a cluster and restoring the snapshot to the data volume using a file system-level backup tool that is able to interpret file system-level changes but is unable to interpret the block-level changes, the operations comprising:
receiving the block-level changes from the data volume stored in an application in a cluster;
creating a file system for the snapshot, wherein the file system comprises a root directory having a plurality of subdirectories;
storing each of the block-level changes in the data volume in a corresponding one of the subdirectories, wherein storing each of the block-level changes into a corresponding one of the subdirectories comprises assigning each of the respective subdirectories a respective label for a respective block-level change stored in the respective subdirectory, wherein the respective label corresponds to a respective location in the data volume where the respective block-level change originated;
creating a manifest for identifying the snapshot in a file system-level backup tool, wherein the manifest is associated with the root directory;
instructing the file system-level backup tool to store the snapshot by:
storing the file system in content-addressable object storage; and storing the manifest in a manifest storage;

receiving the snapshot from the file system-level backup tool by receiving the file system therefrom;

mapping the block-level changes from the respective subdirectories of the file system into a block map of the data volume; and restoring the snapshot to the date volume based on the block map.

14. The non-transitory computer-readable storage medium of claim 13, wherein the operations further comprise:

forming a link between the root directory and a different root directory corresponding to a different snapshot captured before the snapshot; and storing the link in a link subdirectory of the root directory.

15. The non-transitory computer-readable storage medium of claim 13, wherein the operations further comprise:

converting the block-level changes from a format of the data volume into a format for the file system-level backup tool.

16. The non-transitory computer-readable storage medium of claim 13, wherein the operations further comprise:

converting the block map from a format of the file system-level backup tool into a format of the data volume.

17. The non-transitory computer-readable storage medium of claim 13, wherein the operations further comprise:

capturing metadata describing the root directory and the manifest; and storing the metadata in a metadata subdirectory of the root directory.

* * * * *